US008255816B2

(12) United States Patent
Hammock et al.

(10) Patent No.: US 8,255,816 B2
(45) Date of Patent: Aug. 28, 2012

(54) MODIFYING A MAGNIFIED FIELD MODEL

(75) Inventors: David Hammock, Sugar Land, TX (US);
Phil Hodgson, Stavanger (NO); Tedros Kifle, Kvernland (NO); Glen Lillehammer, Hafrsfjord (NO);
Randolph E. F. Pepper, Beijing (CN);
Tram Thi Nhat Tran, Stavanger (NO);
Juliani Vachon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 775 days.

(21) Appl. No.: 12/353,484

(22) Filed: Jan. 14, 2009

(65) Prior Publication Data

US 2009/0192773 A1   Jul. 30, 2009

Related U.S. Application Data

(60) Provisional application No. 61/023,720, filed on Jan. 25, 2008.

(51) Int. Cl.
*G06F 3/048* (2006.01)
*G06T 15/00* (2011.01)
*G06T 17/00* (2006.01)
*G09G 5/02* (2006.01)
*G09G 5/00* (2006.01)
*G06T 11/00* (2006.01)

(52) U.S. Cl. ........ 715/764; 715/781; 345/419; 345/428; 345/594; 345/472; 345/619; 345/617

(58) Field of Classification Search .................. 715/764, 715/781; 345/419, 428, 594, 472, 619, 617
See application file for complete search history.

(56) References Cited

U.S. PATENT DOCUMENTS

| 5,992,519 A | 11/1999 | Ramakrishnan et al. |
| 6,031,930 A * | 2/2000 | Bacus et al. .................. 382/133 |
| 6,215,499 B1 * | 4/2001 | Neff et al. ..................... 345/419 |
| 6,304,266 B1 | 10/2001 | Li |

(Continued)

FOREIGN PATENT DOCUMENTS

WO   WO/99/64896   12/1999

(Continued)

OTHER PUBLICATIONS

Digital Formation LESA (Log Evaluation System Analysis) Feb. 1, 2003 6 pages.*

(Continued)

*Primary Examiner* — Adam M Queler
*Assistant Examiner* — Andrea Long
(74) *Attorney, Agent, or Firm* — Lam Nguyen

(57) ABSTRACT

An example method of modifying a model of a field includes presenting a representation of field data in a first window and receiving a selection of a portion of the representation of the field data. The method further includes presenting the portion of the representation in a second window, creating a magnified portion, where the representation and the magnified portion are presented concurrently. The method further includes receiving a request to modify the field data presented in the magnified portion, modifying the field data based on the request, and based on the modified field data, updating the magnified portion and the representation to obtain a modified magnified portion and a modified representation, respectively. The method further includes concurrently presenting the modified magnified portion in the second window and the modified representation in the first window.

17 Claims, 7 Drawing Sheets

U.S. PATENT DOCUMENTS

| | | | |
|---|---|---|---|
| 6,313,837 B1* | 11/2001 | Assa et al. | 345/420 |
| 6,370,491 B1* | 4/2002 | Malthe-Sorenssen et al. | 703/2 |
| 6,373,489 B1 | 4/2002 | Lu et al. | |
| 6,407,747 B1* | 6/2002 | Chui et al. | 345/660 |
| 6,633,305 B1* | 10/2003 | Sarfeld | 345/671 |
| 6,757,614 B2 | 6/2004 | Pepper et al. | |
| 6,940,507 B2 | 9/2005 | Repin et al. | |
| 7,248,259 B2 | 7/2007 | Fremming et al. | |
| 2002/0063712 A1* | 5/2002 | Ilic | 345/440 |
| 2002/0080149 A1* | 6/2002 | Alexander et al. | 345/634 |
| 2002/0085001 A1* | 7/2002 | Taylor | 345/440 |
| 2002/0163547 A1* | 11/2002 | Abramson et al. | 345/855 |
| 2003/0216897 A1 | 11/2003 | Endres et al. | |
| 2005/0149307 A1 | 7/2005 | Gurpinar et al. | |
| 2006/0197759 A1 | 9/2006 | Fremming | |

FOREIGN PATENT DOCUMENTS

| | | |
|---|---|---|
| WO | WO/2004/049216 | 10/2004 |

OTHER PUBLICATIONS

Adobe Acrobat 7.0 Professional Version 7.0.5 Sep. 23, 2005 4 screenshots.*

* cited by examiner

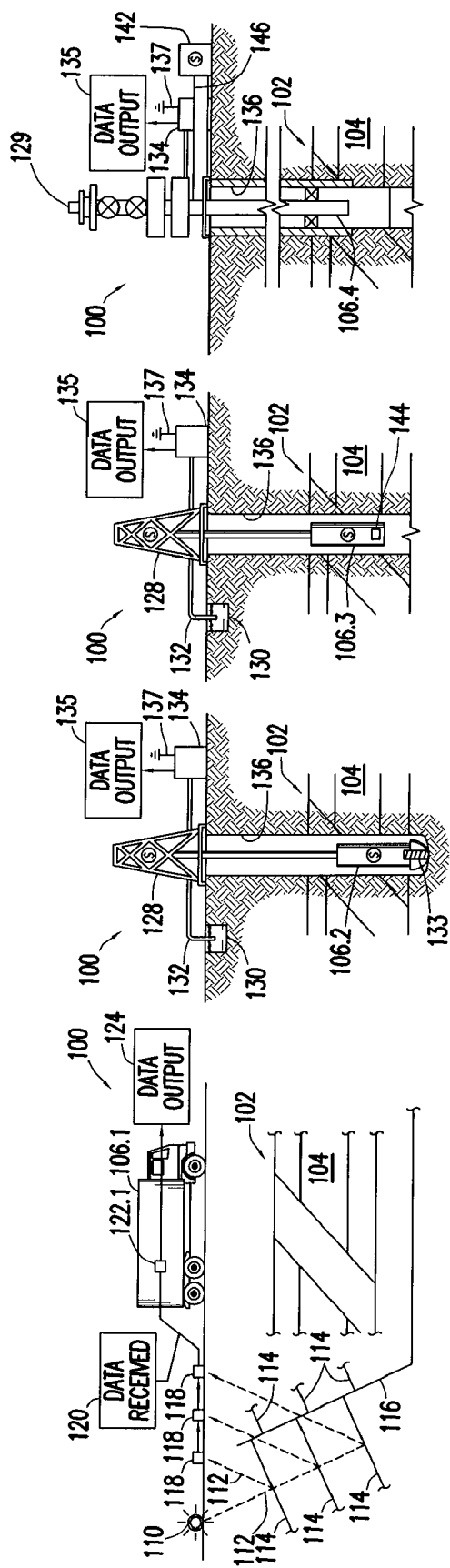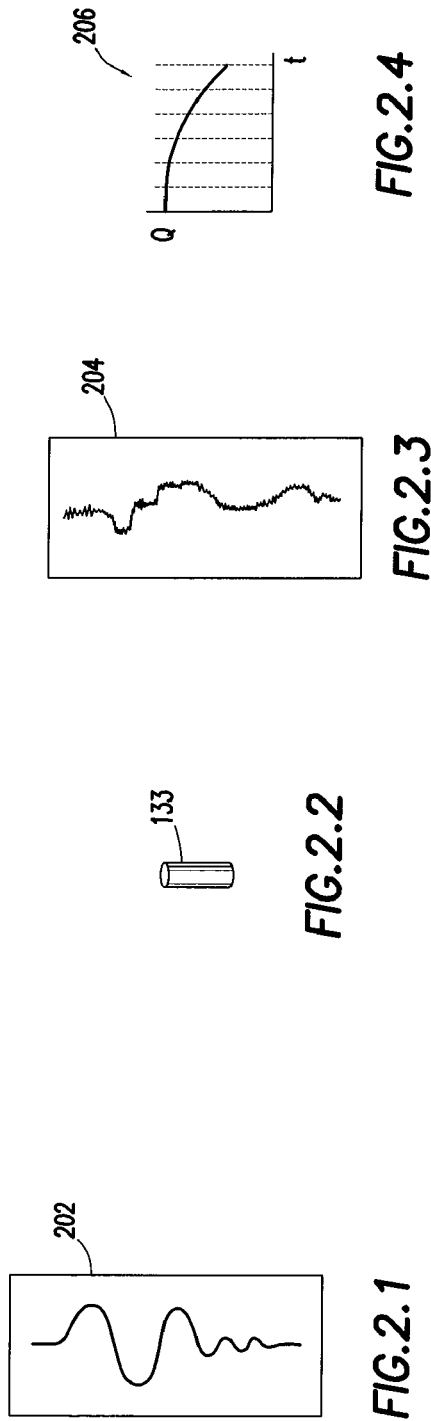

US 8,255,816 B2

MODIFYING A MAGNIFIED FIELD MODEL

CROSS-REFERENCE TO RELATED APPLICATIONS

This application claims priority pursuant to 35 U.S.C. §119 (e) to U.S. Provisional Patent Application No. 61/023,720 entitled "System and Method For Performing Oilfield Operations," filed Jan. 25, 2008 in the names of David Hammock, Phil Hodgson, Tedros Kifle, Glen Lillehammer, Randolph E. F. Pepper, Tram Thi Nhat Tran, and Juliani Vachon, the disclosure of which is incorporated by reference herein in its entirety.

BACKGROUND

Geographic formations are often analyzed to determine the presence of subterranean assets, such as valuable fluids or minerals. Fields are developed within these geographic formations using field operations, such as surveying, drilling, wireline testing, completions, production, planning, and analysis. Information (e.g., data) collected from both field operations and geographic formations is used to assess the underground formations, and this information is used to drive field operations to locate and, if applicable, extract the desired subterranean assets. Such data may be static or dynamic. Data may be collected and used for current or future operations. When used for future operations at the same or other locations, such data may be referred to as historical data.

Data from one or more wellbores may be analyzed to plan or predict various outcomes at a given wellbore. There are usually a large number of variables and large quantities of data to consider in analyzing field operations. It is, therefore, often useful to model the behavior of the field operation to determine a desired course of action. During the ongoing operations, the operating parameters may need adjustment as conditions change and new information is received. In addition, some models perform a predictive function by showing expected results if certain conditions are imposed on, or occur within, a formation.

Various techniques for visualizing data have been developed. Some visualization techniques have the capability of magnifying a certain portion of the rendered data.

SUMMARY

An example method of modifying a model of a field includes presenting a representation of field data in a first window and receiving a selection of a portion of the representation of the field data. The method further includes presenting the portion of the representation in a second window, creating a magnified portion, where the representation and the magnified portion are presented concurrently. The method further includes receiving a request to modify the field data presented in the magnified portion, modifying the field data based on the request, and based on the modified field data, updating the magnified portion and the representation to obtain a modified magnified portion and a modified representation, respectively. The method further includes concurrently presenting the modified magnified portion in the second window and the modified representation in the first window.

Other aspects will be apparent from the following description and the appended claims.

BRIEF DESCRIPTION OF DRAWINGS

So that the above recited features can be understood in detail, a more particular description, briefly summarized above, may be had by reference to the embodiments thereof that are illustrated in the appended drawings. It is to be noted, however, that the appended drawings illustrate only some embodiments and are therefore not to be considered limiting of its scope, for this disclosure may admit to other equally effective embodiments.

FIGS. 1.1 to 1.4 depict a simplified, schematic view of a field having subterranean formations containing reservoirs therein, the various field operations being performed in which embodiments of modifying a model of a field may be implemented.

FIGS. 2.1 to 2.4 are graphical depictions of data collected by the tools of FIGS. 1.1 to 1.4, respectively, in which embodiments of modifying a model of a field may be implemented.

DETAILED DESCRIPTION

Figure 3:
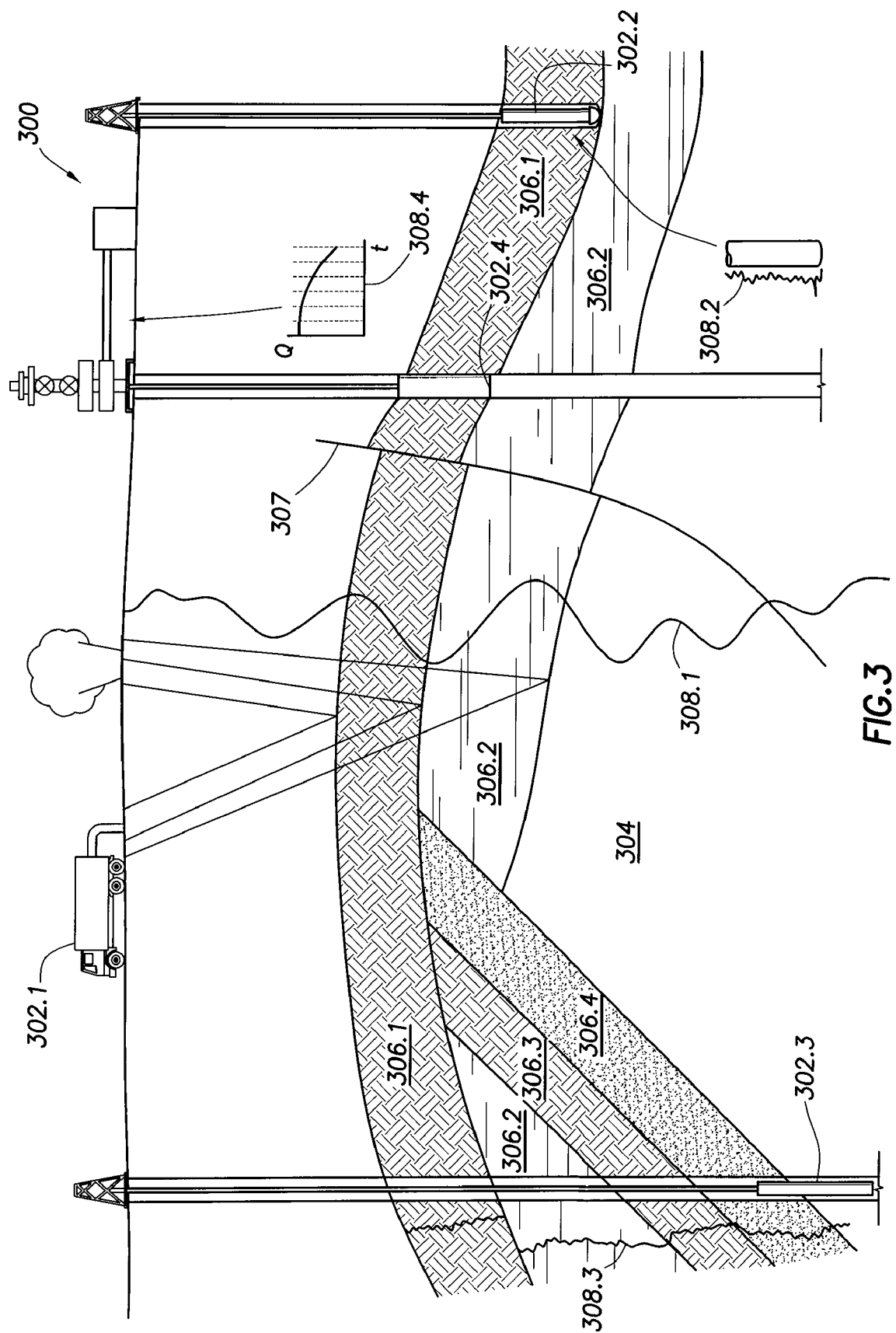
FIG. 3 is a schematic view, partially in cross-section, of a field having a plurality of data acquisition tools positioned at various locations along the field for collecting data from the subterranean formation, in which embodiments of modifying a model of a field may be implemented.

One or more embodiments are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

FIGS. 1.1 through 1.4 depict simplified, representative, schematic views of a field 100 having a subterranean formation 102 containing a reservoir 104 therein and depicting various operations being performed on the field 100. FIG. 1.1 depicts a survey operation being performed by a survey tool, such as a seismic truck 106.1, to measure properties of the subterranean formation. The survey operation is a seismic survey operation for producing sound vibrations. In FIG. 1.1, one such sound vibration 112 generated by a source 110 reflects off a plurality of horizons 114 in an earth formation 116. The sound vibration(s) 112 is (are) received by sensors, such as geophone-receivers 118, situated on the earth's surface. The geophones 118 produce electrical output signals, referred to as data received 120 in FIG. 1.1. The data received 120 is provided as input data to a computer 122.1 of the seismic truck 106.1, and responsive to the input data, the computer 122.1 generates a seismic data output 124.

FIG. 1.2 depicts a drilling operation being performed by a drilling tool 106.2 suspended by a rig 128 and advanced into the subterranean formations 102 to form a wellbore 136. A mud pit 130 is used to draw drilling mud into the drilling tools via a flow line 132 for circulating drilling mud through the drilling tools, up the wellbore 136 and back to the surface. The drilling mud is usually filtered and returned to the mud pit 130. A circulating system may be used for storing, controlling or filtering the flowing drilling muds. The drilling tools are advanced into the subterranean formations to reach a reservoir 104. Each well may target one or more reservoirs. The drilling tools are adapted for measuring downhole properties using logging while drilling tools. The logging while drilling tool may also be adapted for taking a core sample 133 as shown, or removed so that a core sample may be taken using another tool.

A surface unit 134 is used to communicate with the drilling tools and/or offsite operations. The surface unit 134 is capable of communicating with the drilling tools to send commands to the drilling tools, and to receive data therefrom. The surface unit 134 collects data generated during the drilling operation and produces data output 135 which may be stored or transmitted. Computer facilities may be positioned at various locations about the field 100 (e.g., the surface unit 134) and/or at remote locations.

Sensors (S), such as gauges, may be positioned about the field 100 to collect data relating to various operations as described previously. As shown, the sensor (S) is positioned in one or more locations in the drilling tools and/or at the rig to measure drilling parameters, such as weight on bit, torque on bit, pressures, temperatures, flow rates, compositions, rotary speed and/or other parameters of the operation. Sensors (S) may also be positioned in one or more locations in the circulating system.

The data gathered by the sensors (S) may be collected by the surface unit 134 and/or other data collection sources for analysis or other processing. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For instance, the seismic data output may be used to perform geological, geophysical, and/or reservoir engineering. The reservoir, wellbore, surface and/or process data may be used to perform reservoir, wellbore, geological, geophysical or other simulations. The data outputs from the operation may be generated directly from the sensors, or after some preprocessing or modeling. These data outputs may act as inputs for further analysis.

FIG. 1.3 depicts a wireline operation being performed by a wireline tool 106.3 suspended by the rig 128 and into the wellbore 136 of FIG. 1.2. The wireline tool 106.3 is adapted for deployment into a wellbore for generating well logs, performing downhole tests and/or collecting samples. The wireline tool 106.3 may be used to provide another method and apparatus for performing a seismic survey operation. The wireline tool 106.3 may, for instance, have an explosive, radioactive, electrical, or an acoustic energy source 144 that sends and/or receives electrical signals to the surrounding subterranean formations 102 and fluids therein.

The wireline tool 106.3 may be operatively connected to, for instance, the geophones 118 and the computer 122.1 of the seismic truck 106.1 of FIG. 1.1. The wireline tool 106.3 may also provide data to the surface unit 134. The surface unit 134 collects data generated during the wireline operation and produces data output 135 which may be stored or transmitted. The wireline tool 106.3 may be positioned at various depths in the wellbore to provide a survey or other information relating to the subterranean formation.

Sensors (S), such as gauges, may be positioned in the wireline tool 106.3 to measure downhole parameters which relate to, for instance porosity, permeability, fluid composition and/or other parameters of the operation.

FIG. 1.4 depicts a production operation being performed by a production tool 106.4 deployed from a production unit or a Christmas tree 129 and into the completed wellbore 136 of FIG. 1.3 for drawing fluid from the downhole reservoirs into surface facilities 142. Fluid flows from a reservoir 104 through perforations in the casing (not shown) and into the production tool 106.4 in the wellbore 136 and to the surface facilities 142 via a gathering network 146.

Sensors (S), such as gauges, may be positioned about the field 100 to collect data relating to various operations as described previously. As shown, the sensor (S) may be positioned in the production tool 106.4 or associated equipment, such as the Christmas tree 129, gathering network 146, surface facilities and/or the production facility, to measure fluid parameters, such as fluid composition, flow rates, pressures, temperatures, and/or other parameters of the production operation.

While only simplified wellsite configurations are shown, it will be appreciated that the field 100 may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite (s).

While FIGS. 1.2 through 1.4 depict tools used to measure properties of a field 100, it will be appreciated that the tools may be used in connection with non-wellsite operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1 through 1.4 are intended to provide a brief description of an example of a field 100. Part, or all, of the field 100 may be on land, water and/or sea. Also, while a single field measured at a single location is depicted, any combination of one or more fields, one or more processing facilities, and one or more wellsites may be utilized.

FIGS. 2.1 through 1.4 are graphical depictions of examples of data collected by the tools of FIGS. 1.1 through 1.4, respectively. FIG. 2.1 depicts a seismic trace 202 of the subterranean formation of FIG. 1.1 taken by the seismic truck 106.1. The seismic trace may be used to provide data, such as a two-way response over a period of time. FIG. 2.2 depicts a core sample 133 taken by the drilling tools 106.2. The core sample may be used to provide data, such as a graph of the density, porosity, permeability or other physical property of the core sample over the length of the core. Tests for density and viscosity may be performed on the fluids in the core at varying pressures and temperatures. FIG. 2.3 depicts a well log 204 of the subterranean formation of FIG. 1.3 taken by the wireline tool 106.3. The wireline log typically provides a resistivity or other measurement of the formation at various depts. FIG. 2.4 depicts a production decline curve or graph 206 of fluid flowing through the subterranean formation of FIG. 1.4 measured at the surface facilities 142. The production decline curve typically provides the production rate Q as a function of time t.

The respective graphs of FIGS. 2.1 through 2.3 depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2.4 depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

FIG. 3 is a schematic view, partially in cross section, of a field 300 having data acquisition tools 302.1, 302.2, 302.3 and 302.4 positioned at various locations along the field 300 for collecting data of the subterranean formation 304. The data acquisition tools 302.1 through 302.4 may be the same as data acquisition tools 106.1 through 106.4 of FIGS. 1.1 through 1.4, respectively, or others not depicted. As shown, the data acquisition tools 302.1 through 302.4 generate data plots or measurements 308.1 through 308.4, respectively. These data plots are depicted along the field 300 to demonstrate the data generated by the various operations.

Data plots 308.1 through 308.3 are examples of static data plots that may be generated by the data acquisition tools 302.1 through 302.3, respectively. Static data plot 308.1 is a seismic two-way response time and may be the same as the seismic trace 202 of FIG. 2.1. Static plot 308.2 is core sample data measured from a core sample of the formation 304, similar to core sample 133 of FIG. 2.2. Static data plot 308.3 is a logging trace, similar to the well log 204 of FIG. 2.3. Production decline curve or graph 308.4 is a dynamic data plot of the fluid flow rate over time, similar to the graph 206 of FIG. 2.4. Other data may also be collected, such as historical data, user inputs, economic information and/or other measurement data and other parameters of interest.

The subterranean structure 304 has a variety of geological formations 306.1 through 306.4. As shown, the structure has several formations or layers, including a shale layer 306.1, a carbonate layer 306.2, a shale layer 306.3 and a sand layer 306.4. A fault 307 extends through the layers 306.1, 306.2. The static data acquisition tools are adapted to take measurements and detect characteristics of the formations.

While a specific subterranean formation with specific geological structures is depicted, it will be appreciated that the field 300 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the field 300, it will be appreciated that one or more types of measurement may be taken at one or more location across one or more fields or other locations for comparison and/or analysis.

The data collected from various sources, such as the data acquisition tools of FIG. 3, may then be processed and/or evaluated. Typically, seismic data displayed in the static data plot 308.1 from the data acquisition tool 302.1 is used by a geophysicist to determine characteristics of the subterranean formations and features. Core data shown in static plot 308.2 and/or log data from the well log 308.3 are typically used by a geologist to determine various characteristics of the subterranean formation. Production data from the graph 308.4 is typically used by the reservoir engineer to determine fluid flow reservoir characteristics. The data analyzed by the geologist, geophysicist and the reservoir engineer may be analyzed using modeling techniques.

Figure 4:
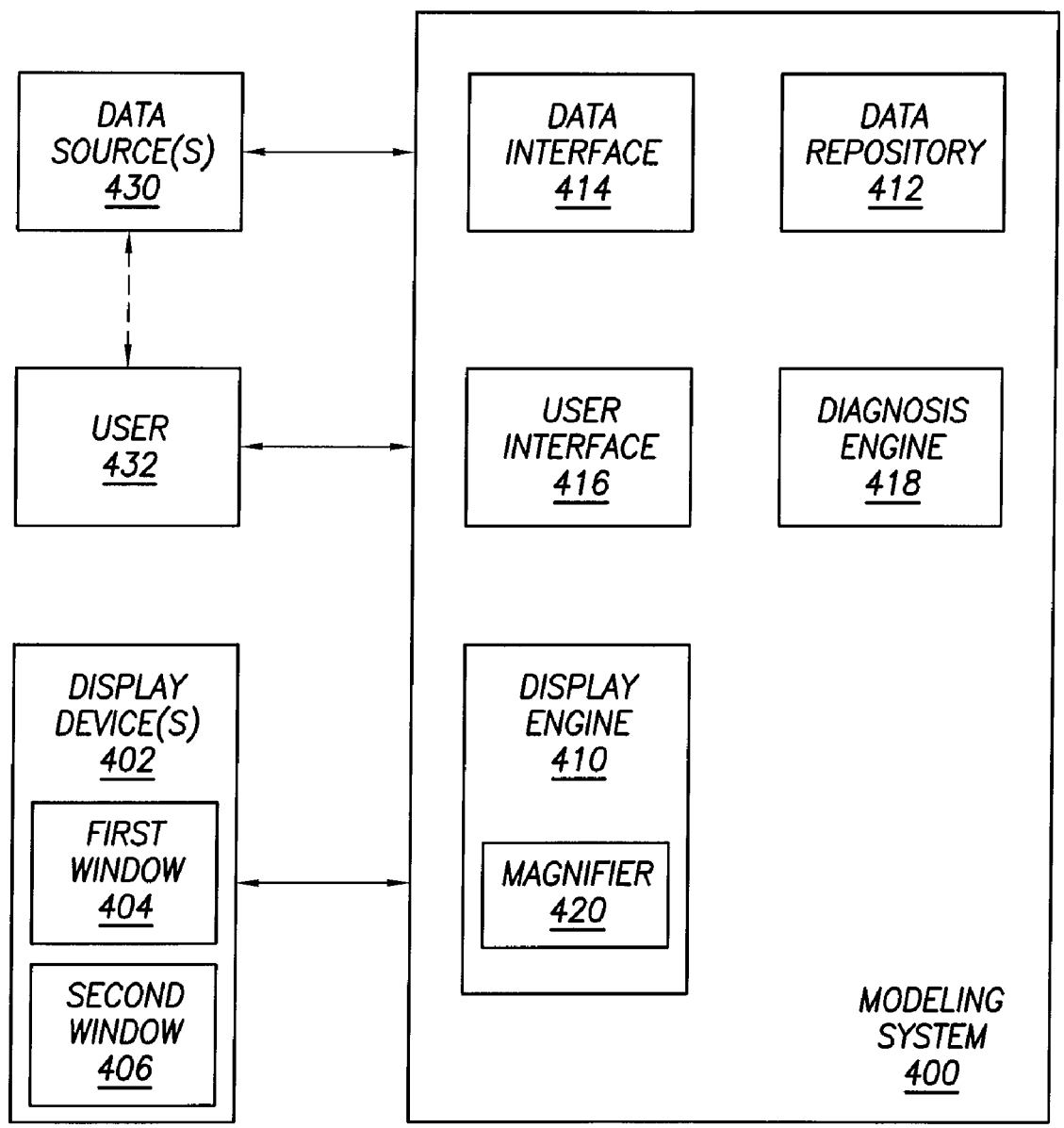
FIG. 4 illustrates an example system in which embodiments of modifying a magnified field model may be implemented.

FIG. 4 illustrates a flow diagram of a modeling system 400 to modify a magnified field model in accordance with one or more embodiments. As shown in FIG. 4, the modeling system 400 includes a display engine 410, a data repository 412, a data interface 414, a user interface 416, and a diagnosis engine 418. The display engine 410 further includes a magnifier 420. The modeling system 400 interacts with, and is operatively connected to, a display device(s) 402, a data source(s) 430, and a user (432). The display device 402 includes a first window 404 and a second window 406. Each of these components is described below. One of ordinary skill in the art will appreciate that embodiments are not limited to the configuration shown in FIG. 4.

In one or more embodiments, the modeling system 400 is configured to interact with one or more data sources 430 using the data interface 414. The data interface 414 may be configured to receive data (e.g., field data) from a data source 430 and/or store data to the data repository 412. In addition, the data interface 414 may be configured to receive data from the data repository 412 and deliver the data to a data source 430. The data source 430 may be one of a variety of sources providing data associated with a field. A data source 430 may include, but is not limited to, a surface unit for collecting data from the field, a computer, a database, a spreadsheet, and a user. A data source 430 may be configured to provide data to the data interface 414 through an automated process, such as through a web-based application, a direct feed, or some other form of automated process. Optionally, a data source 430 may require manual entry of data by a user 432 through the user interface 416.

In one or more embodiments, the modeling system 400 is configured to interact with the user 432 using the user interface 416. The user interface 416 may be configured to receive data and/or instruction(s) from the user 432. The user interface 416 may also be configured to deliver instruction(s) to the user 432. In addition, the user interface 416 may be configured to send data and/or instruction(s) to, and receive data and/or instruction(s) from, the data repository 412 and/or the diagnosis engine 418. The user 432 may include, but is not limited to, an individual, a group, an organization, or some other legal entity. Alternatively, the user 432 may interact with the modeling system 400 using a user system (not shown). A user system may be, or may contain a form of, an internet-based communication device that is capable of communicating with the user interface 416. A user system may correspond to, but is not limited to, a desktop computer with internet access, a laptop computer with internet access, a smart phone, and a personal digital assistant (PDA), or other user accessible device.

In one or more embodiments, the modeling system 400 is configured to obtain and store field data in the data repository 412. In one or more embodiments, the data repository 412 is configured to receive field data from a data source(s) 430 using the data interface 414 and/or from a user 432 using the user interface 416. The data repository 412 is also configured to deliver field data to, and receive field data from, the diagnosis engine 418. The data repository 412 may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data for a field. The data repository 412 may be a device internal to the modeling system 400. Alternatively, the data repository 412 may be an external storage device operatively connected to the modeling system 400.

In one or more embodiments, the modeling system 400 is configured to modify a model using the diagnosis engine 418. The diagnosis engine 418 may be configured to process field data collected from various data sources 430. Further, the diagnosis engine 418 may be configured to create a model using field data. In one or more embodiments, the diagnosis engine 418 modifies the model using additional or modified field data, which can originate from a current or new data source 430. The diagnosis engine 418 may be configured to send the model to the display engine 410 to be presented to the user.

In one or more embodiments, the modeling system 400 is configured to present objects and/or models on the display device(s) 402 using the display engine 410. The display engine 410 may be configured to receive field data from the diagnosis engine 418 and create models and/or objects using the diagnosis engine 418. The magnifier 420 may be configured to select a portion of a model and/or object in the first window 404 to create a scaled view of the selected portion of the model and/or object on an additional viewing space (i.e., the second window 406). In one or more embodiments, the user 432 sends instruction to the magnifier 420 through the user interface 416.

In one or more embodiments, the modeling system 400 is configured to interact with one or more display devices (e.g., display device 402) using the display engine 410. The display device 402 may be part of the modeling system 400. Alternatively, the display device 402 may be an external device operatively connected to the modeling system 400. A display device 402 may include, but is not limited to, a monitor, a screen, or some other form of display. In one or more embodiments, the display device 402 is capable of displaying three-dimensional objects or models. Each display device 402 is configured to display at least the first window 404 or the second window 406. In one or more embodiments, the first window 404 and the second window 406 are displayed concurrently on the same display device 402.

The modeling system 400 may include one or more system computers, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PC's, minicomputers, mainframe computers, and the like.

While specific components are depicted and/or described for use in the units and/or modules of the modeling system 400, it will be appreciated that a variety of components with various functions may be used to provide the formatting, processing, utility and coordination functions necessary to modify a magnified field model in the modeling system 400. The components may have combined functionalities and may be implemented as software, hardware, firmware, or combinations thereof.

Figure 5:
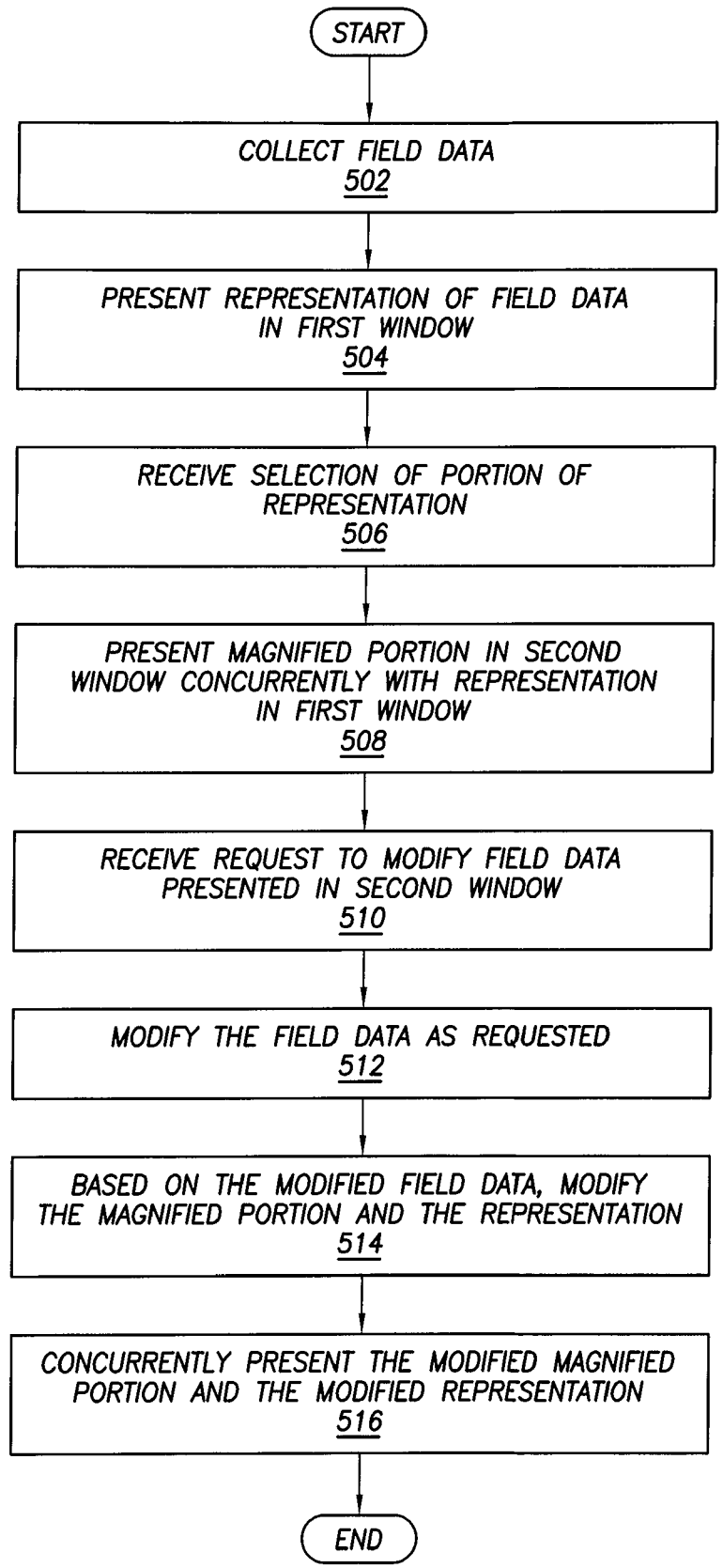
FIG. 5 illustrates an example method for modifying a magnified field model in accordance with one or more embodiments.

FIG. 5 illustrates a flow diagram of a method 500 for modifying a magnified field model in accordance with one or more embodiments. One or more of the blocks shown in FIG. 5 may be omitted, repeated, and/or performed in a different order than that shown in FIG. 5. In addition, a person of ordinary skill in the art will appreciate that other blocks, omitted in FIG. 5, may be included in one or more of these flowcharts. Accordingly, the specific arrangement of blocks shown in FIG. 5 should not be construed as limiting the scope of the inventive concept.

In block 502, field data is collected. The field data may be static or dynamic. In addition, the field data may involve measurements from geologic formation testing and/or from field operations. Types of field data may include, but are not limited to, porosity, resistivity, fluid density, permeability, and fluid pressure. A type of field data, such as data collected during field operations or dynamic data, may also be associated with a wellbore depth, a time, some other measure of relativity, or any combination thereof. Field data may be collected manually and/or through an automated process. Field data may also be estimated or calculated based on other collected field data.

In block 504, a representation of the field data is presented in a first window. The representation may include all or a portion of the field data. More specifically, the representation may include one or more types of field data and/or portions of one or more types of field data. For instance, the types of field data for a field may include measurements for porosity, resistivity, fluid density, and pressure, and the representation captures only the resistivity and pressure. In another instance, the representation captures all of the types of field data (i.e., porosity, resistivity, fluid density, and pressure), but only for measurements associated with a filtered subset of the field data (e.g., a wellbore depth between 5,000 feet and 6,000 feet). In one or more embodiments, the representation is displayed as a three-dimensional model.

In block 506, a selection of a portion of the representation is received. In one or more embodiments, the magnified portion is selected by a user interacting with the representation using an input device (e.g., a mouse, a keyboard, a monitor, etc.). For instance, the user may use the input device to create a selection within the representation on the monitor. In this instance, the selection that the user creates with the input device may correspond to a magnified portion of the representation. Those skilled in the art will appreciate that there are other ways in which a magnified portion of the representation may be selected.

The magnified portion may include all or a portion of the representation. More specifically, the magnified portion may include one or more types of field data and/or portions of one or more types of field data presented in the representation. For instance, the field data presented in the representation includes measurements for porosity, resistivity, fluid density, and pressure; while the magnified portion only includes resistivity and pressure. In another instance, the magnified portion captures all of the types of field data (i.e., porosity, resistivity, fluid density, and pressure) presented in the representation, but only for measurements associated with a filtered subset of the field data (e.g., a wellbore depth between 5,000 feet and 6,000 feet), as opposed to the a larger set of field data presented in the representation.

In combining the two previous scenarios to describe another instance, the magnified portion may include only some of the types of field data presented in the representation and only a portion of the wellbore depth and/or time associated with the field data presented in the representation. In yet another instance, the type of field data included in the magnified portion is seismic data. In a further instance, the type of field data included in the magnified portion is well log data.

In block 508, the magnified portion is presented in a second window, concurrently with the representation being presented in the first window, based on the selection in block 506. The first window and the second window may be presented adjacently, either on the same display or on separate displays. Alternatively, the second window may be presented within the first window. In one or more embodiments, the second window has a lower scale than the first window, allowing the user to view features and details of the field data that would otherwise not be clearly visible on the representation of the field data. The magnified portion may be displayed as a three-dimensional model. In one or more embodiments, the magnified portion may be displayed in a variety of shapes, where the shape of the magnified portion may be adjusted by the user.

The features and details of the magnified portion displayed in the second window may vary based on the type or attributes of the field data that was originally represented on the screen. For instance, if the field data is seismic volume data, then the magnified portion in the second window would display traces or seismograms. Likewise, if the field data is well log traces, then the magnified portion in the second window may display values corresponding to the depths of the well log traces. Embodiments including this feature are described below with respect to FIG. 6.

In block 510, a modification request is received to modify field data displayed in the magnified portion of the second window. The modification request may specify a variety of modifications, including, but not limited to, modifying one or more portions of the magnified portion in the second window, cursor tracking, modifying the underlying field data that is represented in the second window on the display, point selection, shifting a graphical curve (e.g., using ghost curves), editing a graphical curve, modifying color tables, modifying image contrasts, changing scales, and modifying a portion of the representation in the first window that is also displayed in the magnified portion of the second window. In one or more embodiments, the modification request corresponds to a request to perform an interpretation of the field data.

Modification requests may originate from a user or from one or more data sources providing operational field data. In one or more embodiments, the modification request is limited to the field data being collected. Alternatively, additional data may be input, aside from the field data being collected, and the modification request may be based, in whole or in part, on this additional data. The additional data may be input by a user, a different source of field data from that already being used to collect field data for the model, or some other additional source of field data. The additional data may be actual field data or experimental data. Experimental data may be used to analyze speculative scenarios using the model. In one or more embodiments, the modification request is altering a portion (or creating a new portion) of the magnified portion in the second window and/or the representation in the first window. More specifically, in some embodiments, if the type of field data presented in the magnified portion is seismic data, then the modification request may correspond to a request to create a geologic model based on inferences from the seismic data. In other embodiments, if the type of field data presented in the magnified portion is well log data, then the modification request may correspond to a request to create porosity and water saturation data based on inferences from the well log measurements. Embodiments including this feature are described below with respect to FIG. 7.

In block 512, the field data is modified as requested. In block 514, the magnified portion and the representation are updated based on the modified field data.

In block 516, the modified magnified portion and the modified representation are concurrently displayed in the second window and the first window, respectively. The modified magnified portion and/or the modified representation may be displayed as a three-dimensional model. In one or more embodiments, the display of the magnified modified portion enables the user to determine a field operation to modify or perform. Alternatively, the new or modified field operation may be performed by an automated process, such as by the use of a controller that receives automated instructions generated based on the display of the modified magnified portion.

The method in FIG. 5 is depicted in a specific order. However, it will be appreciated that portions of the method may be performed simultaneously or in a different order or sequence. The portions of the method may have combined functionalities and may be implemented as software, hardware, firmware, or combinations thereof.

Figure 6:
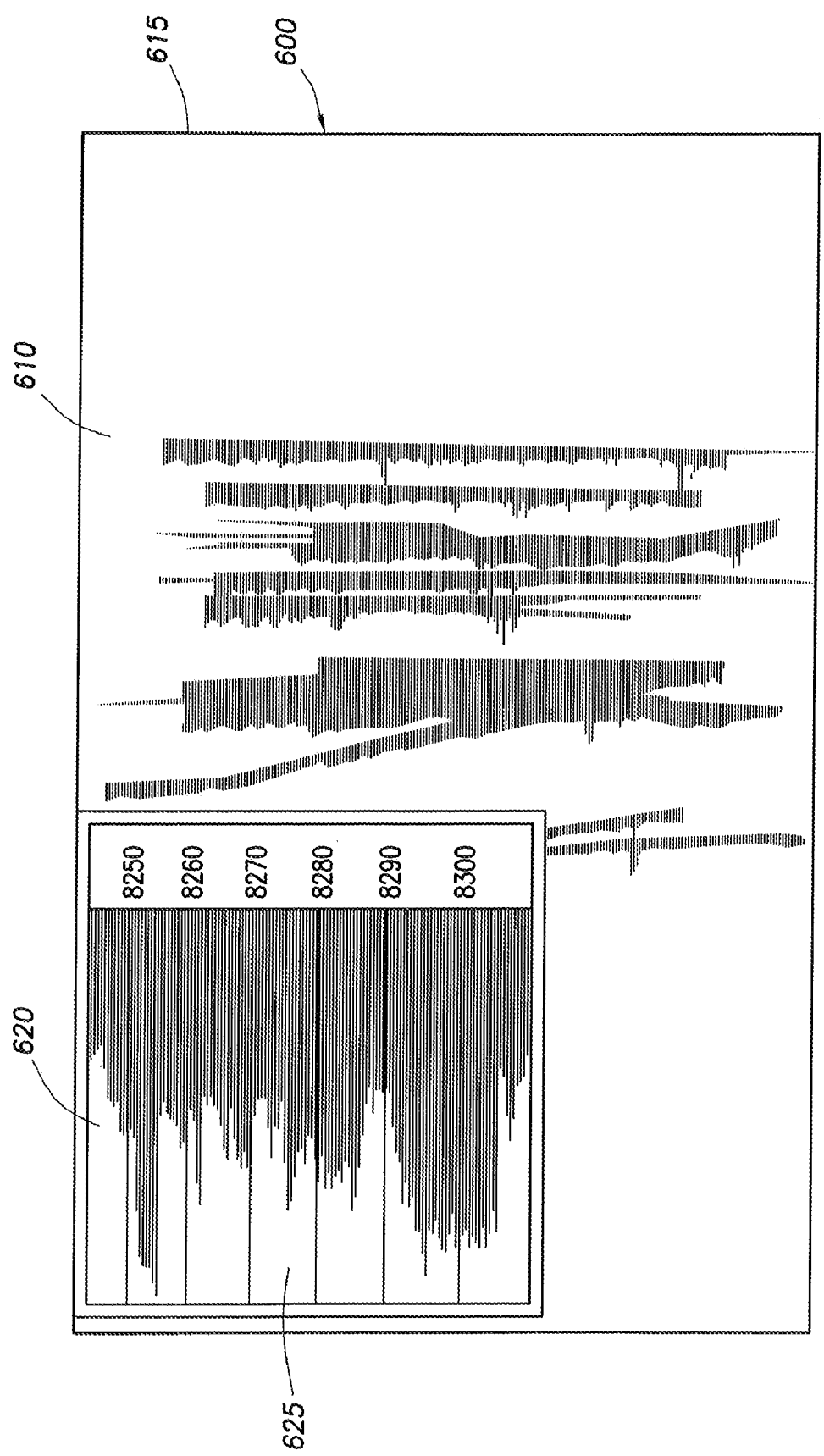
FIG. 6 illustrates an example display for modifying a magnified field model in accordance with one or more embodiments.

FIG. 6 illustrates an example display for modifying a magnified field model in accordance with one or more embodiments of the inventive concept. More specifically, the example in FIG. 6 illustrates concurrently displaying a magnified portion 620 in a second window 625 and a representation 610 in a first window 615. The representation 610 displayed in the first window 615 is shown on the right side of the display 600. Further, the representation includes well log traces. The left side of the display 600 in FIG. 6 shows a magnified portion 620 displayed in a second window 625. In this example, the magnified portion 620 in the second window 625 includes only one of the well log traces from the representation 610 in the first window 615. In addition, the well log trace in the second window 625 is only presented between a depth of 8,250 feet and 8,300 feet.

Figure 7:
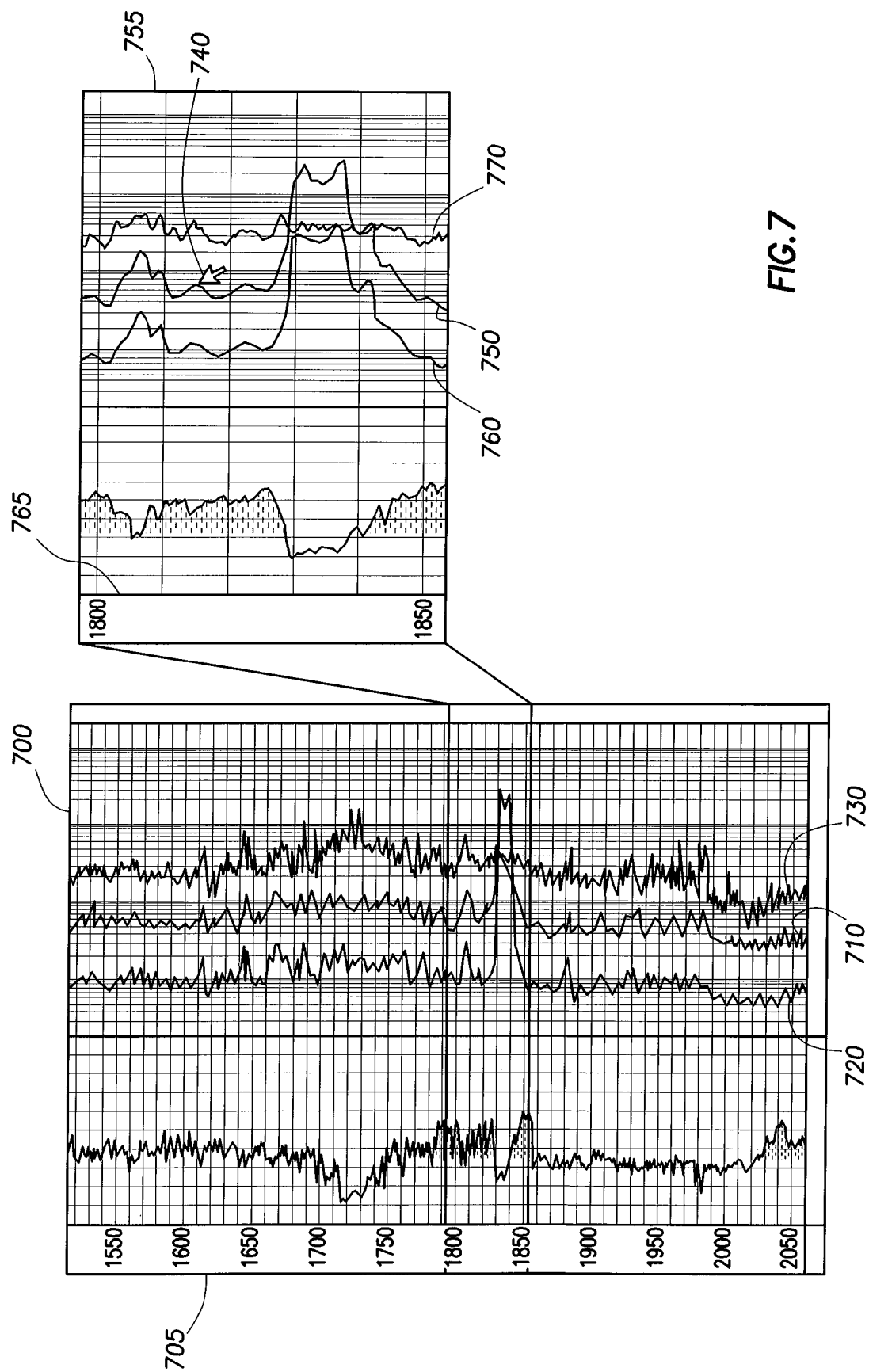
FIG. 7 illustrates an example display for modifying a magnified field model in accordance with one or more embodiments.

FIG. 7 illustrates an example display for modifying a magnified field model in accordance with one or more embodiments of the inventive concept. More specifically, the example in FIG. 7 illustrates receiving a modification request to modify field data displayed in the second window 755. FIG. 7 depicts a first window 700 and a second window 755. The first window 700 includes a vertical axis 705 on the left side, measured in feet, as well as a resistivity curve 720 and a transit time curve 730, graphed on a logarithmic scale. The second window 755 includes a magnified portion of the representation in the first window 700 between a depth of 1800 feet and 1850 feet, as displayed in the vertical axis 765. The resistivity curve 760 and a transit time curve 770 shown in the second window 755 are also graphed on a logarithmic scale. The modification request in this example originates in the second window 755, where the cursor 740 is dragging a copy of the resistivity curve 760 (i.e., a ghost curve 750) toward the transit time curve 770. As this occurs, a corresponding ghost curve 710 in the first window 700 is created and dragged from the resistivity curve 720 toward the transit time curve 730. In one or more embodiments, the cursor 740 in the second window also appears in the corresponding location in the first window.

Figure 8:
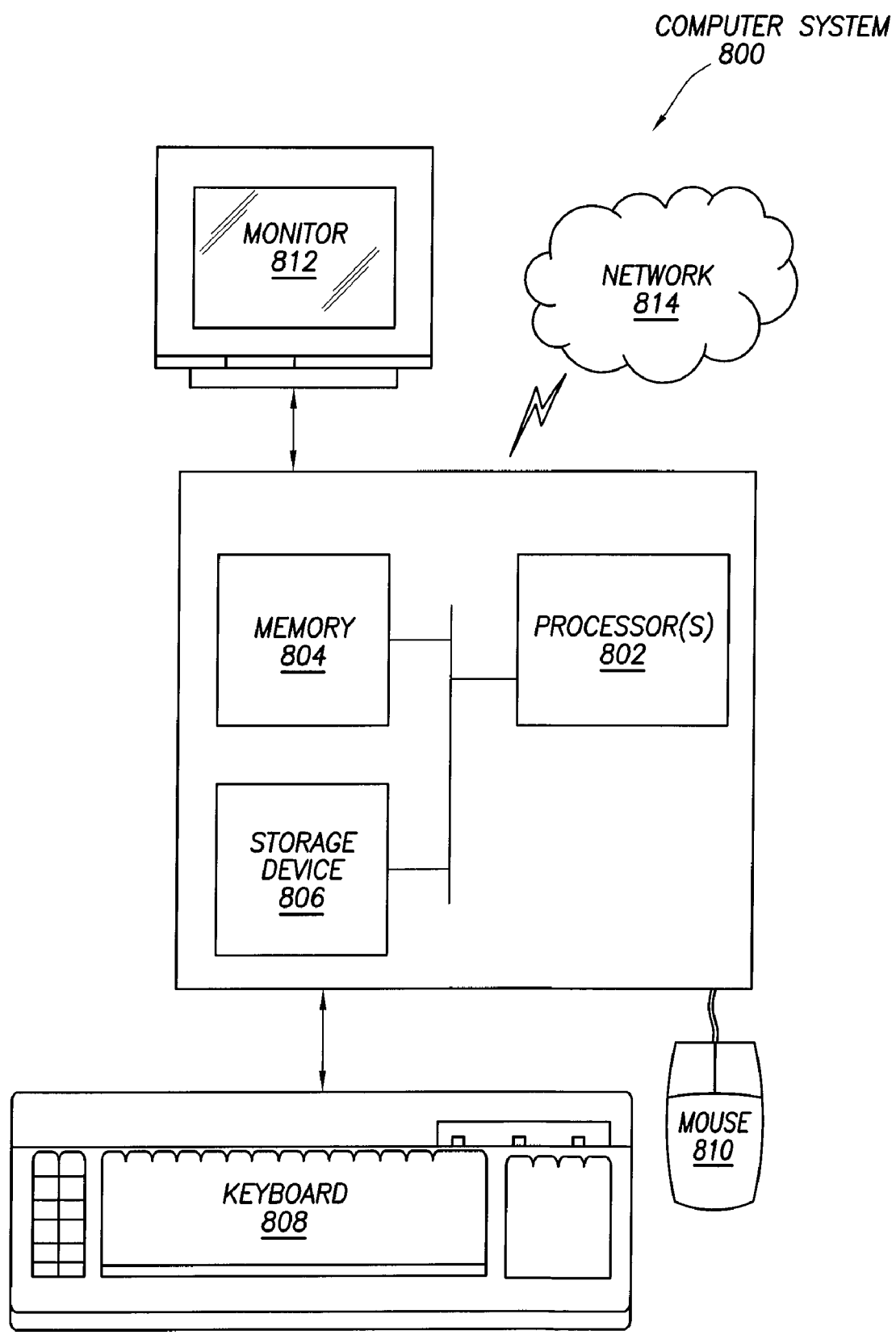
FIG. 8 illustrates an example computer system in which embodiments of modifying a magnified field model may be implemented.

Embodiments of modifying a magnified field model may be implemented on virtually any type of computer regardless of the platform being used. For instance, as shown in FIG. 8, a computer system 800 includes one or more processor(s) 802, associated memory 804 (e.g., random access memory (RAM), cache memory, flash memory, etc.), a storage device 806 (e.g., a hard disk, an optical drive such as a compact disk drive or digital video disk (DVD) drive, a flash memory stick, etc.), and numerous other elements and functionalities typical of today's computers (not shown). The computer 800 may also include input means, such as a keyboard 808, a mouse 810, or a microphone (not shown). Further, the computer 800 may include output means, such as a monitor 812 (e.g., a liquid crystal display LCD, a plasma display, or cathode ray tube (CRT) monitor). The computer system 800 may be connected to a network 814 (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms. Generally speaking, the computer system 800 includes at least the minimal processing, input, and/or output means necessary to practice one or more embodiments.

Further, those skilled in the art will appreciate that one or more elements of the aforementioned computer system 800 may be located at a remote location and connected to the other elements over a network. Further, one or more embodiments may be implemented on a distributed system having a plurality of nodes, where each portion of the implementation (e.g., the diagnosis engine, the display engine) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

While modifying a magnified field model has been described with respect to a limited number of embodiments, those skilled in the art, having benefit of this disclosure, will appreciate that other embodiments may be devised which do not depart from the scope as disclosed herein. Accordingly, the scope should be limited only by the attached claims.

What is claimed is:

1. A method of modifying a geologic model of a field, comprising:
   receiving field data from measurements of properties of the field;
   presenting a first representation of the field data in a first window;
   receiving a selection of a portion of the first representation of the field data;
   presenting the portion of the first representation in a second window as a first magnified portion, the first representation and the first magnified portion being presented concurrently;
   receiving a cursor position in the second window and presenting the cursor in the first window at a corresponding position with respect to the field data;
   receiving a modification request associated with the cursor position to modify the geologic model of the field based on inferences from the field data;
   modifying the geologic model of the field based on the modification request to obtain a modified geologic model of the field;
   based on the modified geologic model of the field:
   updating the first magnified portion to obtain a second magnified portion; and
   updating the first representation to obtain a second representation; and
   concurrently presenting the second magnified portion in the second window and the second representation in the first window.

2. The method of claim 1, wherein the second window is presented within the first window.

3. The method of claim 1, wherein the features of the first magnified portion vary based on the field data.

4. The method of claim 1, wherein receiving the modification request further comprises receiving a request to modify the first magnified portion.

5. The method of claim 1, wherein the modification request corresponds to a request to perform an interpretation of the field data.

6. The method of claim 1, wherein the first magnified portion comprises seismic data and the modification request corresponds to a request to modify the geologic model based on inferences from the seismic data.

7. The method of claim 1, wherein the first magnified portion comprises well log measurements and the modification request corresponds to a request to create porosity and water saturation data based on the geologic model and inferences from the well log measurements to thereby modify the geologic model.

8. The method of claim 1, wherein each of the first magnified portion and the first representation are presented as three-dimensional models.

9. A computer-readable medium for modifying a geologic model of a field, the computer-readable medium having stored thereon computer-executable instructions which when executed by a computer, cause the computer to:
   receive field data from measurements of properties of a field;
   present a first representation of the field data in a first window;
   receive a selection of a portion of the first representation of the field data;
   present the portion of the first representation in a second window as a first magnified portion, the first representation in the first window and the first magnified portion in the second window being presented concurrently;
   receive a cursor position in the second window and presenting the cursor in the first window at a corresponding position with respect to the field data;
   receive a modification request associated with the cursor position to modify the geologic model of the field based on inferences from the field data;
   based on the modification request, updating the first magnified portion to obtain a second modified portion and updating the first representation to obtain a second representation; and
   concurrently presenting the second magnified portion in the second window and the second representation in the first window.

10. The computer readable medium of claim 9, wherein the second window is presented within the first window.

11. The computer readable medium of claim 9, wherein the features of the first magnified portion vary based on the field data.

12. The computer readable medium of claim 9, wherein the modification request corresponds to a request to perform an interpretation of the field data.

13. The computer readable medium of claim 9, wherein the first magnified portion comprises seismic data and the modification request corresponds to a request to modify the geologic model based on inferences from the seismic data.

14. The computer readable medium of claim 9, wherein the first magnified portion comprises well log measurements and the modification request corresponds to a request to create porosity and water saturation data based on the geologic model and inferences from the well log measurements to thereby modify the geologic model.

15. The computer readable medium of claim 9, wherein each of the first magnified portion and the first representation are presented as three-dimensional models.

16. A computer system comprising:
a processor;
an input to receive field data;
an interactive modeling system to:
present a first representation of the field data in a first window;
receive a selection of a portion of the first representation of the field data;
present the portion of the first representation in a second window as a first magnified portion, the first representation and the first magnified portion being presented concurrently;
receive a cursor position in the second window and present the cursor in the first window at a corresponding position with respect to the field data;
receive a modification request associated with the cursor position to modify a geologic model of the field based on inferences from the field data;
modify the geologic model of the field based on the modification request to obtain a modified geologic model of the field;
based on the modified geologic model of the field:
update the first magnified portion to obtain a second magnified portion; and
update the first representation to obtain a second representation; and
concurrently present the second magnified portion in the second window and the second representation in the first window.

17. The computer system of claim 16 wherein the input comprises a data interface configured to receive the field data from a data source wherein the data source comprises a surface unit for collecting the field data from the field; and further comprising a controller operatively coupled to the surface unit, wherein the controller is configured to actuate a mechanism at the field to modify a field operation based on the modified geologic model of the field.

* * * * *